TIME DISPLACED MEMORY DRIVE

Filed May 1, 1964

INVENTOR
EMERSON W. PUGH

BY David M. Koffsky
ATTORNEY 3,387,291

TIME DISPLACED MEMORY DRIVE

Emerson W. Pugh, Hughsonville, N.Y., assignor to International Business Machines Corporation, New York, N.Y., a corporation of New York Filed May 1, 1964, Ser. No. 364,172
11 Claims. (Cl. 340—174)

ABSTRACT OF THE DISCLOSURE

A means for rapidly energizing pulsed operation circuits which contain circuit elements having long time constants. A data pulse is applied to said circuit elements and a time adjacent, opposite-polarity pulse is also applied, which opposite-polarity pulse counteracts currents that persist in the circuit element, in order to clear it for subsequent data pulses.

This invention relates to pulsed operation circuits and more particularly to a means for energizing pulsed operation circuits.

In modern data processing and communications equipment, circuits are subjected to high pulse repetition rate energizations. Often it is necessary to provide these circuits with elements which exhibit electrical time constants which are long in relation to the time spacing between succeeding pulse energizations. One such circuit configuration is the flat film memory array.

Such arrays are presently fabricated in two distinct forms. In the first, magnetic bits are deposited directly onto an insulating substrate and the bit, word, sense and ground conductors are then applied. In the second configuration, the thin film bits are laid directly on a conductive substrate which both supports the bits and also acts as the ground return conductor. This configuration has been found economically and technically attractive due to the elimination of separate ground conductors, the ease in which the bits can be deposited on the substrate, and the low characteristic impedance of the configuration. However, a major disadvantage of this configuration has been the deterioration in memory operation which results from ground plane currents which persist (long after the drive pulse has been terminated) due to the long time constant of the ground plane.

Accordingly, it is an object of this invention to provide a means for energizing a circuit which contains a long time constant circuit element in a manner to prevent the build-up of unwanted persistent currents in the element.

It is another object of this invention to provide an improved memory system which utilizes conductive ground planes but which exhibits improved operating characteristics.

It is a further object of this invention to provide a conductive ground plane flat film memory system wherein unwanted persistent ground plane currents and resulting fields are reduced.

Still another object of this invention is to provide a conductive ground plane flat film memory array having reduced sense line noise.

The foregoing and other objects, features and advantages of the invention will be apparent from the following more particular description of a preferred embodiment of the invention, as illustrated in the accompanying drawings.

In accordance with the objects of this invention, a circuit package, which includes a circuit element that exhibits a long electrical time constant and conductors which terminate at the element, is provided with means for energizing the conductors with desired polarity potentials. The energizing means also includes further means for generating time adjacent, opposite polarity conductor energizations which counteract the undesired defined currents created by the aforementioned potential energizations.

In the drawings.

Figure 1:
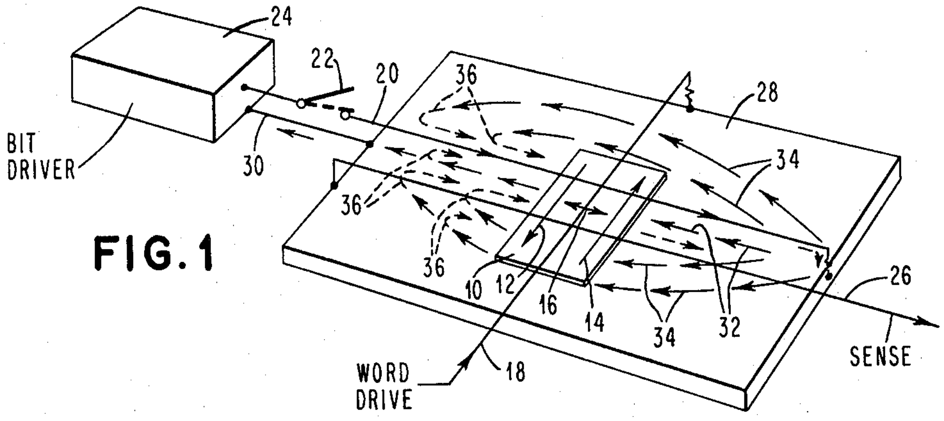
FIG. 1 is a metallic ground plane flat film memory configuration showing only 1 bit.

In order to gain an understanding of the causes of, and effects resulting from ground plane current, reference is made to FIG. 1 wherein a simplified flat film memory bit position is shown. Bit 10, which is supported by ground plane 28, is a thin nickel-iron film which exhibits anisotropic characteristics, that is, stable "easy" directions of magnetic orientation as indicated by arrows 12 and 14 and orthogonally oriented "hard" directions of orientation as indicated by double-headed arrow 16. Overlaying bit 10 are three conductors which cause the storage, read out and sensing of a bit of data. Conductor 18 is a word line which, when energized, causes bit 10 to become oriented in its hard, unstable direction 16. Conductor 20 is a bit line and is adapted to be energized in a bipolar manner so as to enable bit 10 to be oriented in either of its two stable orientations, e.g., as indicated by arrows 12 and 14. Bit line 20 is energized through switch 22 from bit driver 24. Conductor 26 is the sense line which provides a signal indicative of the rotational flux variations within bit 10 when bit line 20 and word line 18 are simultaneously energized. Each of conductors 18, 20 and 26 are connected to conductive ground plane 28 which serves as a ground return when the respective conductors are energized. Bit driver 24 is also grounded to ground plane 28 by ground conductor 30.

To cause bit 10 to assume the easy direction of magnetization indicated by arrow 12, it is necessary to simultaneously energize word line 18 and bit line 20. As aforestated, the energization of word line 18 causes the magnetic orientation of bit 10 to assume its hard direction 16. By closing switch 22, a negative potential is applied between bit line 20 and ground line 30 by bit driver 24. This causes a current to flow (opposite the indicated arrows) via ground conductor 30, ground plane 28, bit conductor 20 and back into bit driver 24. The resultant additive fluxes at bit 10 causes its magnetic orientation to be rotated in a counterclockwise manner so that when the word line energization is interrupted, bit 10 assumes the magnetic state indicated by arrow 12. If it is desired to have bit 10 assume the stable state indicated by arrow 14, it is merely necessary to apply a positive potential to bit line 20 while simultaneously energizing word line 18.

In actual operation, bit line 20 is energized for a considerably longer period than word line 18, the energization of bit line 20 extending both before and after the energization of word line 18. This technique of operation assures that bit 10 invariably assumes the desired magnetic state of orientation once the word line energization is terminated. To accomplish this function, however, it is necessary to keep bit line 20 energized for a considerable portion of the memory cycle time.

Since, during each memory cycle, bit line 20 is energized in either a positive or a negative sense (depending upon the desired information to be stored in bit 10) considerable ground current is induced into ground plane 28. If the worse case situation occurs, wherein a long succession of pulses of one polarity occurs, the aforementioned ground current becomes appreciable. When it is additionally realized that an actual memory comprises hundreds and even thousands of similar bit lines, the magnitude of the ground current in ground plane 28 is apparent.

Figure 2:
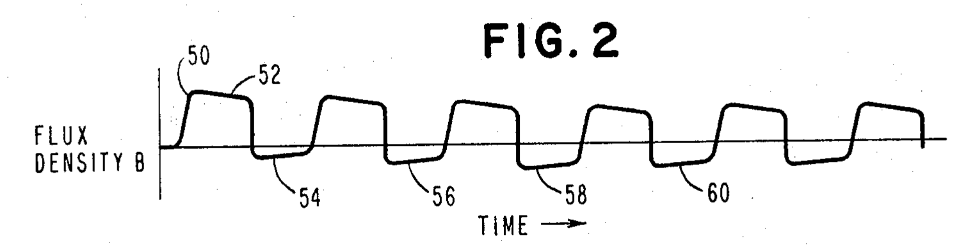
FIG. 2 is a waveform diagram of the magnetic field acting on a bit as it conventionally appears.

It has been determined that the total flux which acts upon bit 10 is the sum of the flux generated by the current in bit line 20 and the current passing beneath bit 10 in ground plane 28 (as indicated by arrows 32). Assuming a positive potential output from bit driver 24, the closure of switch 22 causes current to simultaneously flow into bit line 20 and out of ground plane 28 via conductor 30. It is at this instant of time that the flux density is greatest at bit 10 since the current in ground plane 28 (neglecting ground plane current from previous pulses) is confined to a discrete area beneath the bit (as indicated by arrows 32). Referring to FIG. 2 where the flux density at bit 10 is plotted versus time, the maximum flux phenomena can be seen as indicated at point 50 on the waveform.

After switch 22 has been closed for a short period of time, the current in ground plane 28 begins to diffuse, as indicated by arrows 34. This effect causes a slight lessening in the flux applied to bit 10 and is indicated in FIGS. 2 at point 52 on the waveform. When bit 10 assumes its desired remanence state upon the termination of the word drive, switch 22 is opened to remove the bit line excitation. Due, however, to the inherent inductance of ground plane 28, current continues to flow therein, but because switch 22 is open, the current does not enter conductor 30, rather it appears to reverse direction and pass beneath bit 10 as indicated by arrows 36. Reverse current 36 is therefore seen to induce a subtractive flux into bit 10 as indicated at 54 in FIG. 2. Since the time constant of ground plane 28 is long with respect to the cycle time of the memory (1–2 microseconds versus 100–300 nanoseconds) reverse current 36 is not dissipated when the next operation of bit driver 24 occurs. If it is assumed (as indicated by FIG. 2) that a series of positive impulses are applied to bit line 20, it is obvious that the magnitude of reverse current 36 increases with each successive bit line energization. This results in increasingly higher subtractive polarity fluxes 56, 58, 60, etc., being applied to bit 10 as the memory continues to operate. Since this effect directly opposes the desired flux direction, it is patently detrimental to the operation of the system. The magnitude of DC reverse current 36 in ground plane 28 has been found to be directly proportional to the duty cycle of the pulses appearing on bit line 20. In other words, the percentage of time in a memory cycle during which bit pulses appear on bit line 20 has a direct bearing on the magnitude of the ground plane current. In present memory systems, the duty cycle approximates 20%.

Since the flux appearing at bit 10 is contributed equally by the current in bit line 20 and the return current in ground plane 28, the deterioration in the applied field can be expressed as:

$$H \text{ applied} = KI(\tfrac{1}{2}+\tfrac{1}{2}(1\text{-duty cycle}))$$

where K is a constant and I is the bit current.

The above expression gives the effect of the reverse ground plane current which results from the energization of a single bit line. It must be remembered however, that in an actual memory there are many bit lines all of which contribute to this phenomenon. It has also been found that not only does the persisting reverse ground plane current increase the current driver requirements and make more difficult the fabrication of disturb insensitive bits, but it also creates considerable noise in the sense lines.

Figure 3:
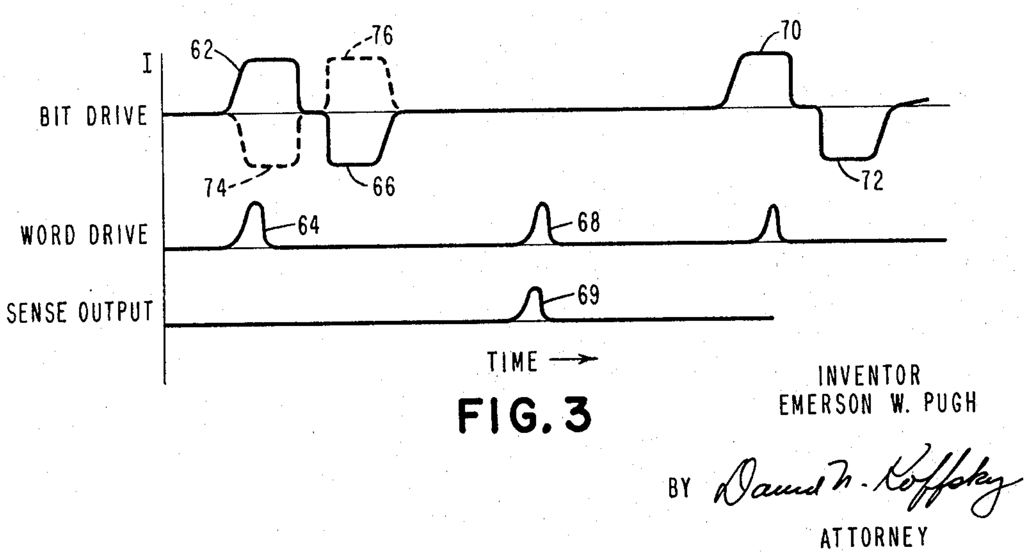
FIG. 3 is a showing of waveform diagrams illustrating the operation of the embodiment of FIG. 1 in accordance with this invention.

As aforestated, it has been discovered that the reverse current build-up creates a flux which opposes the flux generated by a subsequent data signal. As a result of this discovery, it has been determined that if a bipolar drive is utilized wherein an opposite polarity signal either precedes or succeeds the desired data signal, that the reverse current in the ground plane is swept out and the data signal experiences little or no attenuation. This innovation can best be understood by referring to FIG. 3 wherein current waveforms of memory operation in accordance with this invention are shown. As previously described, bit 10 may be made to attain one or the other of its easy remanent states, by applying coincident pulses to both the word and bit lines. These energizations are shown respectively by waveforms 62 and 64. With positive currents 62 and 64 applied respectively to bit line 20 and word line 18, bit 10 is caused to orient itself in the direction shown by arrow 14. Now, if this were a conventional memory drive scheme, the termination of the energization 62 of bit line 20 would create reverse current 36 (FIG. 1) in ground plane 28. This ground current would subsist until the next bit pulse were applied to bit line 20. However, in this case, bit driver 24 immediately applies an opposite polarity pulse 66 to bit line 20 which causes the reverse current to be swept out of ground plane 28 via bit line 20 and into bit driver 24. Once pulse 66 terminates, substantially all of the reverse current has been swept out of ground plane 28 and the bit position is prepared for the next read-write cycle. In normal memory operation, the next occurrence is a read pulse wherein word line 18 is energized and causes the magnetic orientation of bit 10 to rotate to the direction indicated by arrow 16. This rotation creates a changing flux which is sensed by sense line 26 (waveform 69) and fed to a sense amplifier (not shown) which provides a signal indicative of the stored data bit. The next write cycle then occurs with either a positive or negative energization being applied to bit line 20 in accordance with the desired information to be inserted into bit 10. In this case, waveform 70 indicates that a positive potential is again applied to bit line 20 causing bit 10 to be oriented in direction 14. As aforestated, the immediately succeeding opposite polarity signal 72 causes the reverse current to be swept out of the ground plane.

It should be here emphasized that, if desired, waveform 72 can *precede* bit drive pulse 70 and a substantially identical operation will occur. Moreover, if a negative energization is applied to bit line 20 (as indicated by dotted waveform 74) then, it also may be either preceded or succeeded by a positive going signal 76. The same technique of operation is also beneficial when applied to word lines; however, the lower duty cycle of the word line in most memories makes this unnecessary. In either case, the more nearly the energies of the two successive opposite polarity pulses are equal, the more nearly is the persisting reverse current reduced to zero.

Figure 4:
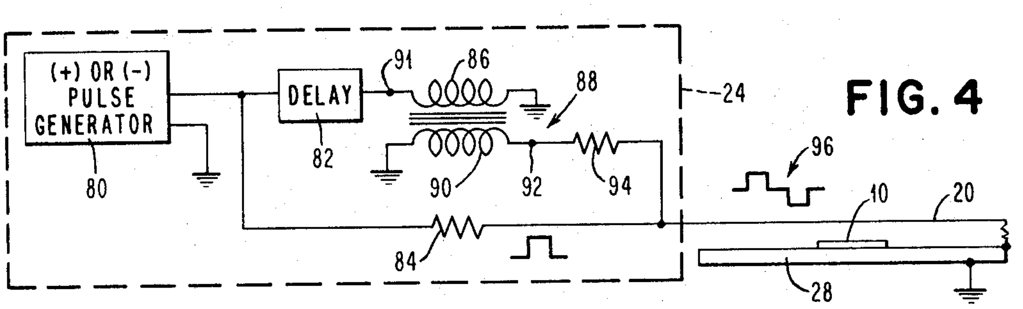
FIG. 4 is a schematic diagram of a driver which operates in accordance with the teachings of this invention.

Referring now to FIG. 4, a circuit diagram of a driver is shown wherein the aforementioned bipolar drive pulses may be achieved. Bit driver 24 includes a pulse generator 80 which is capable of either producing a positive or a negative pulse. Such signal generators are common to the memory art and will not be further described. The output of pulse generator 80 is applied in parallel to delay network 82 and resistor 84. The output signal appearing across resistor 84 is fed directly to bit drive line 20 and thence to ground plane 28. The delay network 82 is slightly longer than the duration of the pulse output from pulse generator 80 so that the signal emerging therefrom is offset by one pulse time from the signal appearing across resistor 84. The output of delay 82 is applied via terminal 91 to primary winding 86 of transformer 88. Transformer 88 may be of the well known bifilar type wherein primary conductor 86 and secondary conductor 90 are wound around a magnetic core with the signal connections thereto being such as to cause a signal inversion between input terminal 91 and output terminal 92. The delayed and inverted pulse signal is then applied through resistor 94 to bit line 20 and ground plane 28. The time sequence of the aforementioned respective pulses is shown at 96. If instead of producing a positive output pulse, pulse generator 80 produces a negative output pulse, the negative signal is immediately passed through resistor 84 to bit line 20. The negative signal is also delayed in delay 82 and inverted in transformer 88 and subsequently applied as a positive going pulse to bit line 20.

The preceding has referred, in the main, to flat film memories, and the problems which arise due to the induced persistent ground plane reverse currents. It should be understood, however, that like phenomenon can occur in any circuit wherein a long time constant circuit element is subjected to high repetition rate unipolar impulses. Such phenomenon has been observed in current drivers which utilize transformer outputs. When driven at a high repetition rate, a persistent current with a long time constant is induced in the secondary with a resultant deterioration of the output. This problem can be cured by using the concepts of this invention.

While the invention has been particularly shown and described with reference to a preferred embodiment thereof, it will be understood by those skilled in the art that the foregoing and other changes in form and details may be made therein without departing from the spirit and scope of the invention.

I claim:

1. In a circuit package having a circuit element which exhibits a long electrical time constant and conductors which terminate at said circuit element, the combination comprising:

means for energizing said conductors with desired polarity potentials, said potentials creating defined currents in said circuit element, said means further including other means for eliminating said defined currents, which other means generates time adjacent opposite polarity energizations of said conductors that sweep out said defined currents.

2. The invention as defined in claim 1 wherein said opposite-polarity energizations immediately succeed said desired polarity potentials.

3. The invention as defined in claim 1 wherein said opposite-polarity energizations immediately precede said desired polarity potentials.

4. The invention as defined in claim 1 wherein the desired polarity potentials produced by said energizing means is a high repetition rate pulse train, the time spacing between successive pulses in said train being short in relation to the time constant of said circuit element.

5. In a circuit package having a ground plane and conductors which terminate at said ground plane, the combination comprising:

means for energizing said conductors with desired polarity potentials to create defined currents in said ground plane, said means further including other means for eliminating said defined currents, which other means generates time adjacent opposite-polarity energizations of said conductors that sweep out said defined currents from said ground plane.

6. The invention as defined in claim 5 wherein said opposite-polarity energizations immediately succeed said desired polarity potentials.

7. The invention as defined in claim 5 wherein said opposite-polarity energizations immediately precede said desired polarity potentials.

8. In a circuit package having a ground plane and conductors which terminate at said ground plane;

pulse generation means for selectively generating positive or negative signals, said signals creating defined currents in said ground plane; and circuit means coupling said pulse generation means to said conductors, each said circuit means including a direct signal path and a parallel delay-inverter path, said delay-inverter path adapted to produce a delayed opposite-polarity signal in response to an input from said pulse generation means, for eliminating said defined currents in said ground plane.

9. In a memory the combination comprising:

a conductive plate connected to a reference potential;

a plurality of magnetic memory elements disposed on said plate;

conductive means disposed adjacent said elements and adapted when energized, to affect the magnetic state of said elements; and signal generation means connected to said conductive means for generating immediately succeeding opposite-polarity energization signals, one of said signals acting to induce undesired persistent ground plane currents and the other acting to nullify the action of said one signal.

10. In a memory array, the combination comprising:

a conductive ground plane connected to a reference potential;

a plurality of thin film magnetic memory elements disposed on said ground plane;

conductive drive windings disposed adjacent each said element and adapted when energized to affect the magnetic state of each said element; and signal generation means connected to said conductive drive windings for generating immediately succeeding opposite-polarity energization signals, one of said signals acting to induce undesired persistent ground plane currents and the other acting to nullify said undesired currents.

11. In a memory array, the combination comprising:

a conductive ground plane connected to a reference potential;

a plurality of thin film magnetic memory elements disposed on said ground plane;

conductive drive windings disposed adjacent each said element and adapted when energized to affect the magnetic state of each said element and to create persistent defined currents in said ground plane;

pulse generation means for selectively generating positive or negative signals; and circuit means coupling said pulse generation means to said conductive drive windings, each said circuit means including a direct signal path and a parallel delay inverter path, said direct signal path adapted to pass a signal from said pulse generation means which creates said persistent defined current, said delay inverter path adapted to produce a delayed opposite polarity signal in response to a signal from said pulse generation means, for eliminating said persistent defined currents in said ground plane.

References Cited

UNITED STATES PATENTS 2,623,106 12/1952 Fassberg ------------ 324—68

BERNARD KONICK, *Primary Examiner.*

JAMES W. MOFFITT, *Examiner.*

P. SPERBER, *Assistant Examiner.*